UNITED STATES PATENT OFFICE.

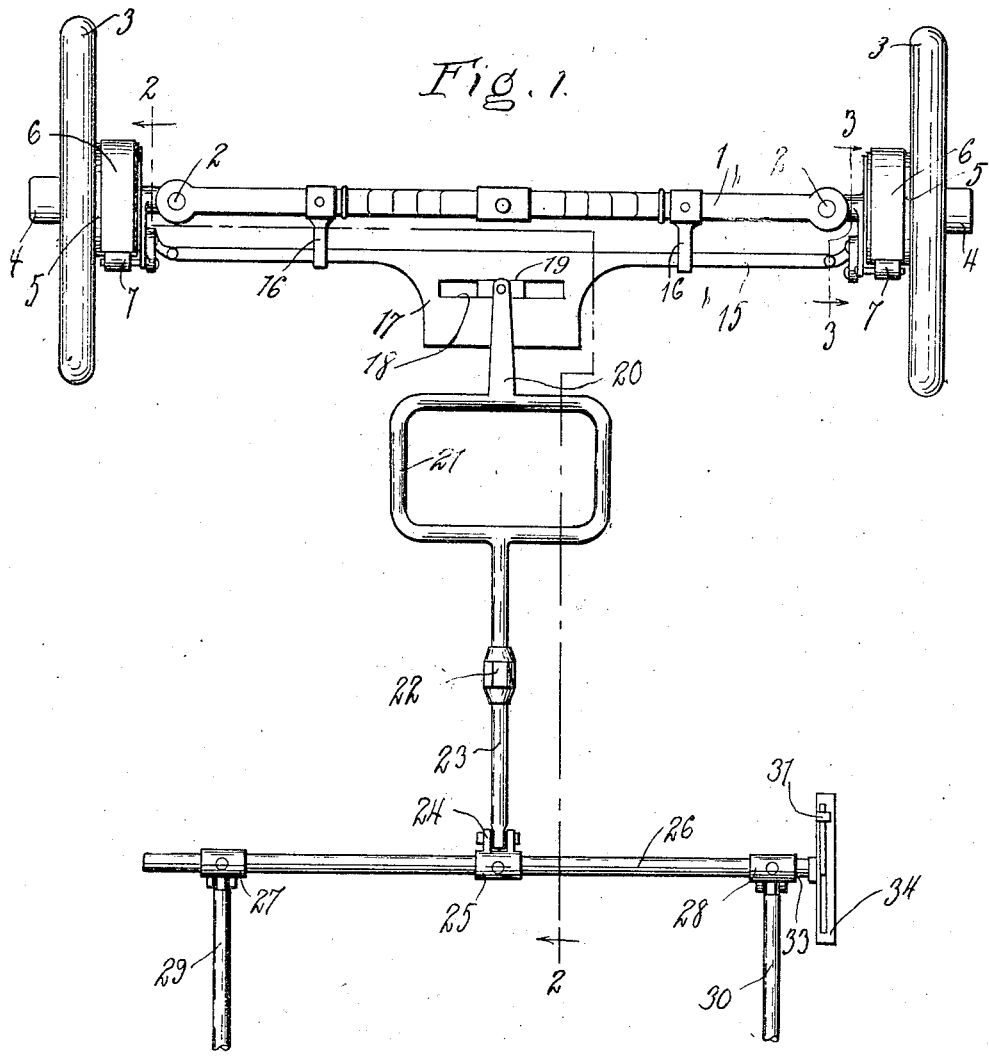

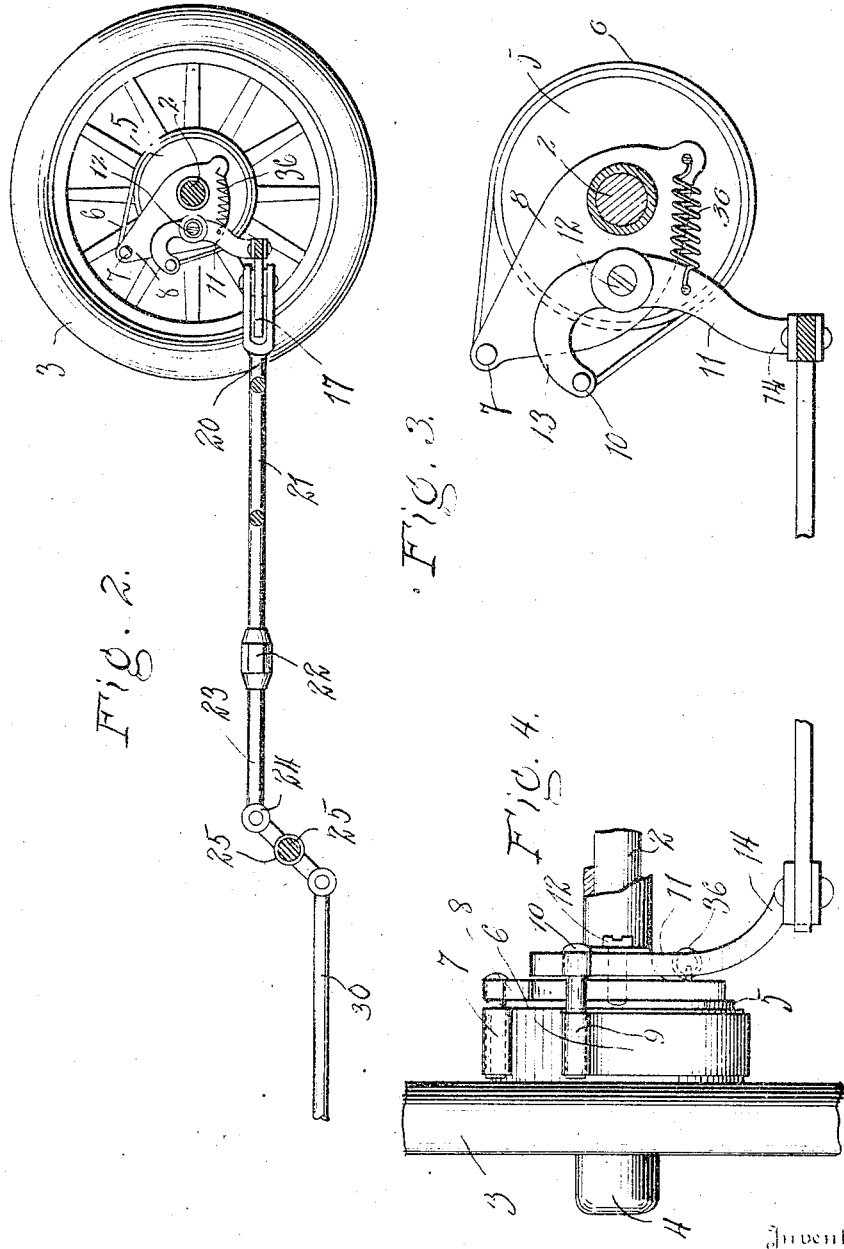

STANLEY S. BENDS, OF CHICAGO, ILLINOIS.

FRICTION-BRAKE.

1,250,270.  Specification of Letters Patent.  Patented Dec. 18, 1917.

Application filed May 1, 1914. Serial No. 835,663.

*To all whom it may concern:*

Be it known that I, STANLEY S. BENDS, a citizen of the United States, residing at Chicago, in the county of Cook and State of Illinois, have invented certain new and useful Improvements in Friction-Brakes, of which the following is a specification.

This invention relates to brakes, and more particularly to friction brakes for automobiles or other like vehicles.

The primary object of the invention is the provision of friction brakes and mechanism for operating the brakes which are attached to the front and rear wheels of an automobile or like vehicle, so as to synchronously apply the brakes to all four wheels of the vehicle for instantaneously stopping the same for the prevention of accidents.

Another object of this invention is the provision of connections between the manually operated brake operating levers and the brake mechanism proper, whereby the tension of the brake mechanism may be regulated to suit conditions, and furthermore means which will permit of the swinging movement of the front wheels of the vehicle, to accommodate the turn or rounding of corners.

With the foregoing and other objects in view, this invention consists in such novel features of construction, combination and arrangement of parts as will be hereinafter more fully described, illustrated in the accompanying drawings, and claimed.

In describing the invention in detail, reference will be had to the accompanying drawings wherein like charactres of reference designate like or corresponding parts throughout the several views, and in which:—

Figure 1 is a plan view of a fragment of the running gears of an automobile, showing the improved brake mechanism applied to the front or steering wheels of the vehicle, and showing the mechanism for operating the brake mechanism.

Fig. 2 is a sectional view taken on the line 2—2 of Fig. 1,

Fig. 3 is a sectional view taken on the line 3—3, of Fig. 1, and

Fig. 4 is a side elevation of Fig. 3.

Referring more particularly to the drawings, 1 designates the front axle of an automobile or like vehicle, which has connected thereto the stub-axles 2, which stub-axles are pivotally connected to the axle 1 so as to permit of the turning or swinging movement of the wheels 3, which wheels are supported by the stub axles for the turning or steering of the vehicle. The numeral 4 designates the hubs of the wheel. Drums 5 are carried by the wheels 3 and they have positioned peripherally thereupon the friction brake bands 6, which brake bands or straps have one of their terminal ends curved about and attached to rods 7, which rods are supported by brackets 8. The brackets 8 are mounted upon the stub axles and positioned inwardly of the brake drum 5, so as to provide substantial and efficient supports for the rods 7. The ends 9 of the brake bands 6, are connected to the terminal ends 10 of levers 11. The levers are pivotally mounted upon pins 12. The portion 13 of the levers 11, which portions extend above the pivotal point 12, are curved, so that when a pull is administered to the lower terminal ends 14 the brake straps or bands 6 will be drawn taut, causing the same to frictionally engage the periphery of the drums 5, for retarding the rotation of the wheels 3 and stopping the travel of the vehicle. The terminal ends 14, of the levers 11, are bifurcated and are connected to a bar 15, which bar is parallel with the axle 1 and extends completely across the width of the vehicle, as is clearly shown in Fig. 1 of the drawings. Suitable guides 16 are secured to the axle 1 in any suitable manner and engage the bar 15. Intermediate the ends of the bar 15, a lug or enlargement 17 is formed, which is provided with a cut out portion or slot 18, in which slot travels the block 19. The block 19 is connected to a rod 20, which rod extends longitudinally along the frame (not shown) of the vehicle (not shown) and is enlarged or has a rectangular portion 21 formed intermediate its ends for the accommodation of the fly wheel of the engine (not shown) used for propelling the vehicle. The rod 20 is connected, through an adjustable turn buckle 22, to a second rod 23, which second rod is in turn pivotally connected between the arms 24 formed upon a collar 25. The collar 25 is rigidly mounted upon a shaft 26, which shaft extends transversely of the rod 23, and has mounted thereupon adjacent its terminal ends collars 27 and 28, upon which are formed arms. The said arms have pivotally connected thereto the rods 29 and 30. The rods 29 and 30 extend rearwardly of the transverse shaft 26, and are connected to the mechanism for operating the brakes, (not shown) which are connected to the rear wheels of the vehicle.

A lever 31 is connected to a terminal end 33 of the transverse shaft 26, and it is provided for the manual operation of the shaft, for operating the various collars and rods which are connected thereto for applying the brakes to the vehicle for stopping the travel of the same. The lever 31 coacts with a quadrant 34, for holding the brakes in a closed position when desired.

Coil springs 36 have one of their ends connected to the levers 11, between the terminal ends 14 and the pivotal point of the levers, and the other ends of the springs are connected to the brackets 8 as shown, so as to move the levers 11 rearwardly immediately upon release of the tension upon the levers by operation of the hand lever 31 for relieving the gripping or frictional engagement between the brake bands 6 and the peripheries of the drums.

In the operation of the improved mechanism as heretofore described, when the lever 31 is operated for rotating the rocker shaft 26, the rods 23 and 20 will be moved longitudinally, by the rocking of the shaft 26, and this will in turn move the bar 15, causing the same to pull the levers 11 outwardly, which will pull upon the frictional brake straps or bands, causing them to frictionally engage the peripheries of the drums 5 for retarding the rotation of the wheels 3. The rocker shaft 26 being connected to the brake mechanisms of the rear wheels of the vehicle, will upon the rocking of the shaft 26 also apply the brakes to the rear wheels, retarding the rotation of the rear wheels, thereby synchronously applying the brakes to all four wheels of the vehicle and immediately retarding or stopping the forward motion of the same. Immediately upon release of the hand lever 31 the coil spring 36 will move the lever 11, relieving the frictional binding engagement between the brake shaft 6 and the peripheries of the drum 5, and permitting rotation of the various wheels of the vehicle. The provision of the slot 18 will permit the bar 15 to move laterally of the supporting frame of the vehicle, independent of movement of the rod 20 which will avoid interference with the steering of the front wheels of the vehicle.

What is claimed is:—

The combination with a main axle of a vehicle having stub axles pivotally connected thereto and wheels mounted upon the stub axles, of a brake drum carried by each wheel, a bracket supported by each stub axle, a lever pivotally carried by the bracket, a brake band having one end connected to the bracket and the other end connected to the lever, a bar extending substantially parallel to the main axle and connected to the lever, and means connected to the bar for rocking said levers to apply the brakes.

In testimony whereof I affix my signature in presence of two witnesses.

STANLEY S. BENDS.

Witnesses:
HENRY A. WECLEWSKI,
WALTER J. BYLEWSKI.